March 14, 1967 G. CHIEGER 3,309,107
AIR-SINGLE LEAF SPRING WHEEL SUSPENSION FOR TRAILER
Filed Nov. 14, 1963 4 Sheets-Sheet 1

INVENTOR.
GEORGE CHIEGER
BY
Millman and Jacobs
ATTORNEYS

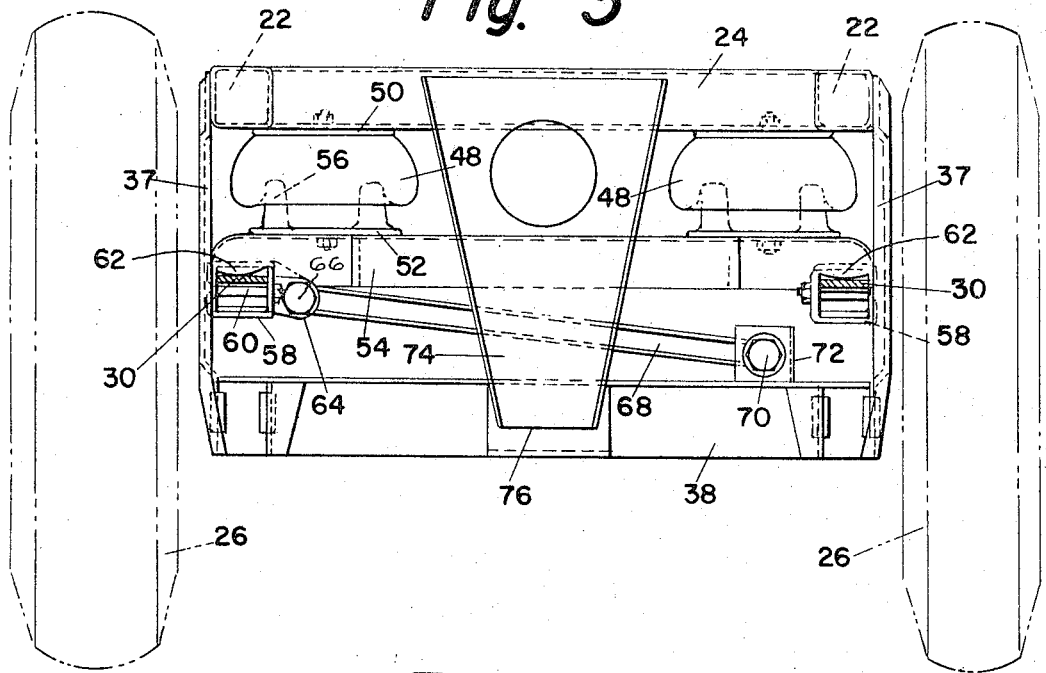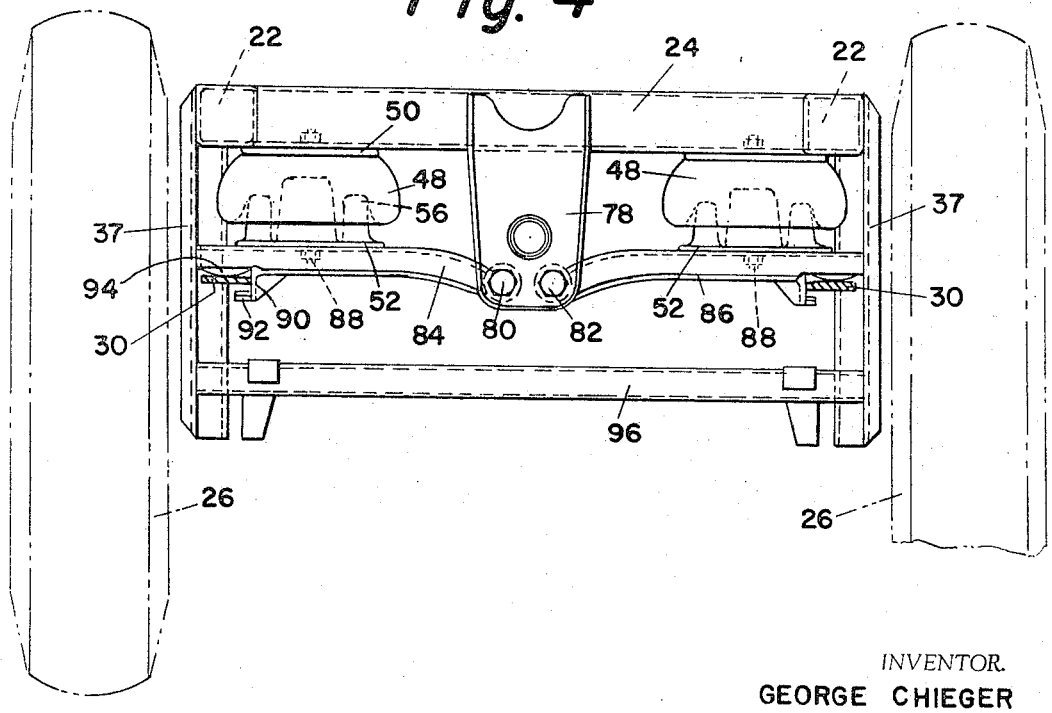

INVENTOR.
GEORGE CHIEGER
BY
Millman and Jacobs
ATTORNEYS

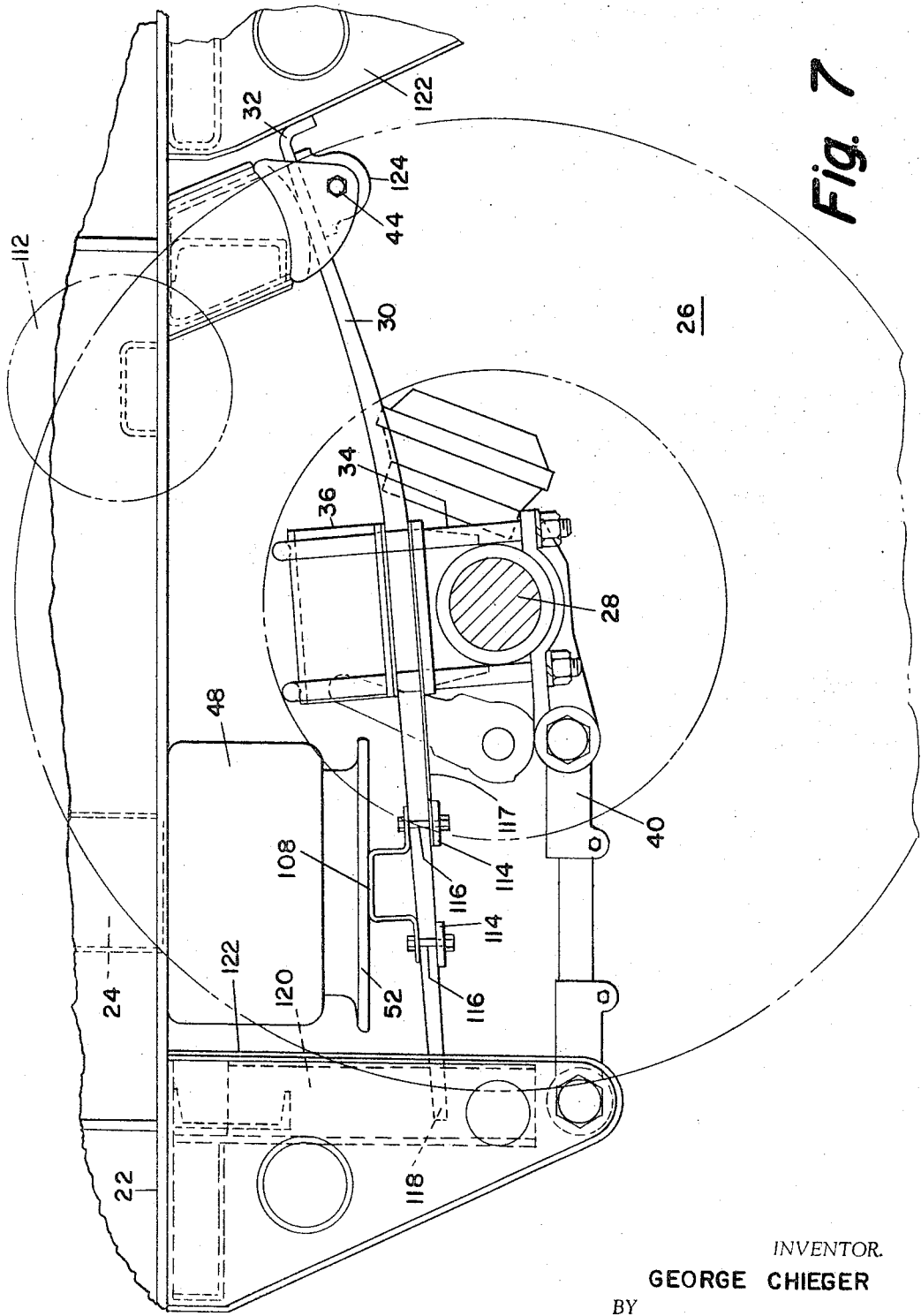

United States Patent Office 3,309,107
Patented Mar. 14, 1967

3,309,107
AIR-SINGLE LEAF SPRING WHEEL SUSPENSION
FOR TRAILER
George Chieger, Birmingham, Mich., assignor to Fruehauf Corporation, Detroit, Mich., a corporation of Michigan
Filed Nov. 14, 1963, Ser. No. 323,705
8 Claims. (Cl. 280—124)

This invention relates to a wheel suspension for vehicles and constitutes a continuation-in-part of my copending application, Ser. No. 256,297, filed Feb. 5, 1963, now abandoned.

The primary object of the invention is to provide a wheel suspension which combines a relatively stiff or high rate single leaf spring and an air bag which is located at the front thereof so that the braking energy will be absorbed by the high rate leaf spring rather than the low rate air bag thereby minimizing the tendency of the vehicle to squat or chatter which occurs in wheel suspensions employing leaf springs and air bags located at the rear of the leaf springs.

Another object of the invention is to provide an airsingle leaf spring suspension with the air bag at the front thereof whereby roll stability is provided because the rear halves of the springs are solidly attached to the axles and therefore are deflected separately and the brake torque is carried to the vehicle frame from each axle through its own spring.

Another object of the invention is to provide a spring suspension for a vehicle combining a leaf spring with an air bag located at the front thereof which requires no shock absorbers because of the stability which is provided by the rear spring halves.

Another object of the invention is to provide a spring suspension for a vehicle combining a leaf spring with an air bag located at the front thereof, hangers at the rear and lateral stabilizers at the front whereby side loads due primarily to jackkniving during parking or executing sharp turns are absorbed by the springs and transmitted to the vehicle frame via the hangers and stabilizers.

Another object of the invention is to provide a spring suspension for a vehicle comprising leaf springs, air bags at the front thereof and lateral stabilizing means joining the air bags, the leaf springs being so connected to the stabilizing means to permit limited fore and aft movement and thus militate against binding and allow control of the axle by tie rods. The lateral stabilizing means also permits the spring centers to be wide apart for extra stability while the air bags are closer together inboard of the wheels for required clearance.

These and other objects of the invention will become more apparent as the following description proceeds in conjunction with the accompanying drawings, wherein:

FIG. 3 is a sectional view taken on the line 3—3 of FIG. 2;

FIG. 4 is a view similar to FIG. 2 of a modified form of the invention;

FIG. 7 is a view similar to FIG. 2 of yet another form of the invention.

Specific reference is now made to the drawings in which similar reference characters are used for corresponding elements throughout.

Figure 1:
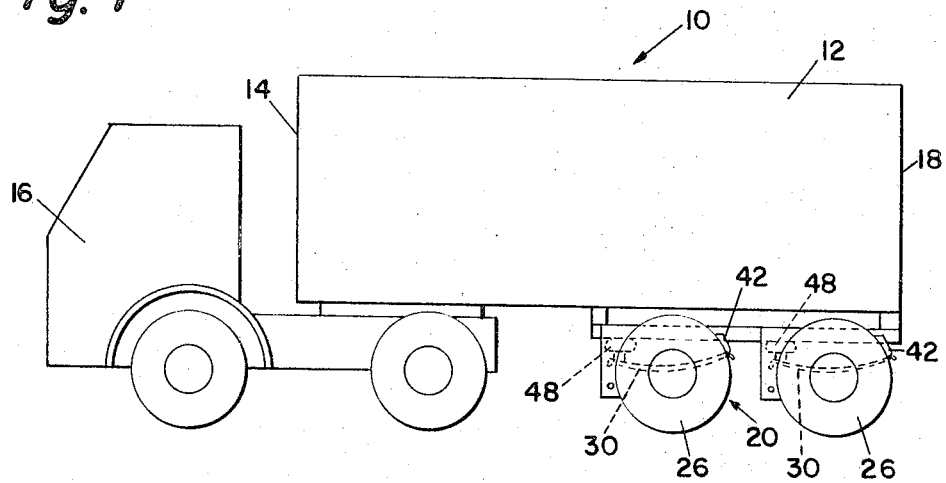
FIG. 1 is a side elevational view of a vehicle embodying the present wheel suspension.

Indicated generally at 10 is a vehicle, such as a conventional over-the-road trailer, having a body 12 to the forward portion 14 of which is coupled a prime mover or tractor 16 and to the rear portion 18 of which is secured a tandem axle wheeled unit 20. The chassis frame of the wheeled unit is appropriately secured to the rear portion of the body beneath the same and includes interconnected longitudinal and transverse members 22 and 24. The wheels 26 are mounted at the ends of longitudinally spaced transversely extending axles 28 which are suspended from the frame by the spring support of the instant invention. While one such suspension will be described hereinafter, it will be understood that the description applies to both axles.

A single leaf spring 30 is provided whose ends are formed with downwardly bent portions 32, there being two longitudinally extending transversely spaced springs for each axle. A relatively stiff spring is preferred as opposed to a soft spring, the term "relatively stiff spring" being intended to mean one whose rating is in the order of magnitude of 7,000–11,000 lbs./in. of deflection, or about twice that of the normal spring rating.

The axle is clamped centrally to and beneath the leaf springs by suitable U-shackles 34 and clamping blocks 36. Connected between the axle clamps and front hangers 37 which depend from the member 24 and are joined by transverse frame member 38 are longitudinal adjustable radius tie rods 40 which serve to hold the axles at right angles to the longitudinal axis of the chassis frame and in substantial parallelism, the rods also acting to take up the horizontal force components when the brakes are applied. Towards the rear of the vehicle, the chassis frame is provided with depending substantially U-shaped brackets 42 between whose legs extends a bolt 44 which is spaced from an upper curved portion 46, the rear portion of the leaf spring 30 extending through said space. Thus, the rear end of the spring is mounted for limited vertical and sidewise movement, the fore and aft movement being limited by the downwardly bent portion 32.

Interposed between the front end of the spring 30 and the chassis frame and located inboard of the wheels is a low rate pneumatic spring in the form of a commercially available flexible air bag 48. The bag is mounted between upper and lower plates or pedestals 50 and 52, the former being secured to the upper transverse frame member 24, the latter or lower pedestal being secured to a transversely extending bridging member 54 which ties the air bags together. The lower pedestal includes upstanding cushions 56 which are adapted to engage the upper pedestal as a fail-safe device should the air bag develop a leak.

Depending from each end of the bridging member 54 is a box-like bracket 58 having a lower pin or bolt 60 spaced from an upper curved member 62, the front end of the leaf spring 30 extending through said space for limited vertical, sidewise and fore and aft movement.

Extending inwardly from one of the brackets 58 is a lug 64 which mounts around a horizontal pivot as at 66, one end of a transversely extending stabilizer rod 68, the other end of the rod being mounted around a horizontal pivot 70 carried by a bracket 72 which is secured on the lower transverse frame member 38 beneath the other air bag. The rod 68 is in effect a transverse radius rod serving to restrain the air bags from moving as a unit fore and aft or from side to side. Depending centrally from the upper transverse frame member 24 is a substantially U-shaped hanger 74 whose lower connecting web 76 is adapted to engage the rod 68 to prevent excessive expansion of the air bags.

Figure 2:
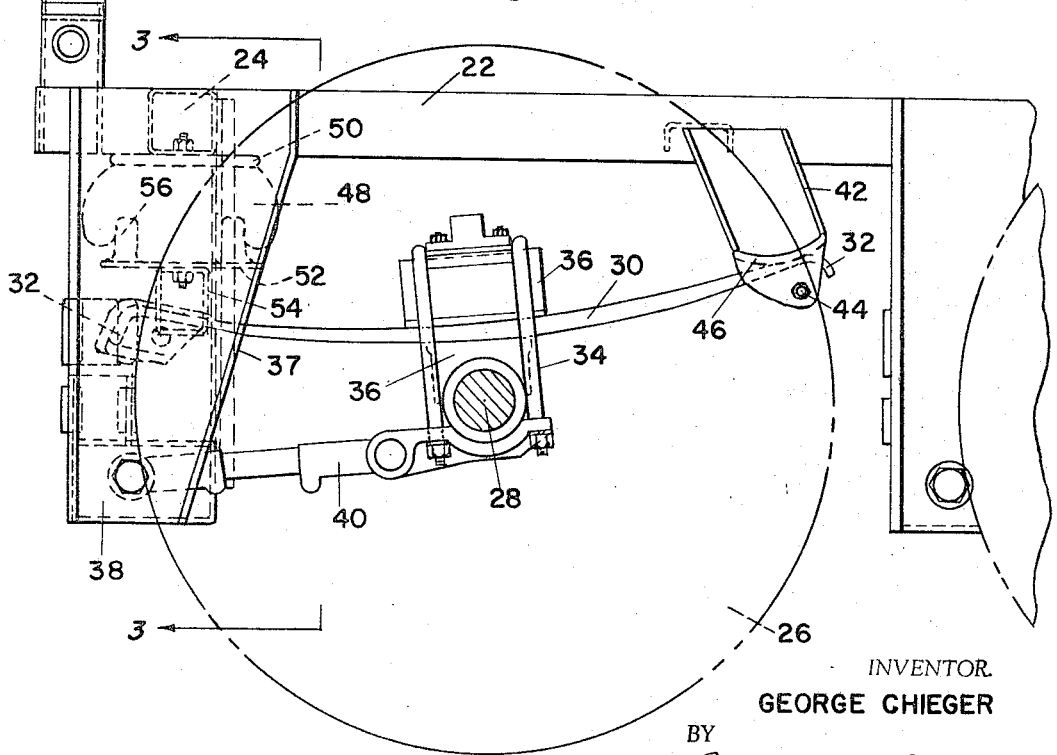
FIG. 2 is a longitudinal sectional view through the axle and looking inboard of the vehicle.

The modification shown in FIG. 4 differs from that of FIGS. 2 and 3 in that a pair of lateral stabilizers is used instead of a single stabilizer. Thus, there depends centrally from the upper frame member 24 a substantially U-shaped bracket 78 between the legs of which at their lower ends are pivoted around horizontal axes 80 and 82 two transversely extending bars 84 and 86. The lower pedestals 52 of the air bags are mounted as at 88 on the bars 84 and 86 inboard of the wheels, the ends of the bars including bracket portions 90 having a lower lateral lug 92 spaced from an upper curved surface 94, the front end of the spring 30 extending through said space for limited vertical, sidewise and fore and aft movement. To prevent excessive air bag expansion a stop is provided, preferably in the form of a transverse member 96 adapted to engage the lugs 92. Thus, when a load is applied to the body it is transferred directly from the hanger 78 to each spring end via the two stablizer bars 84 and 86 and thence to the axle.

Figure 5:
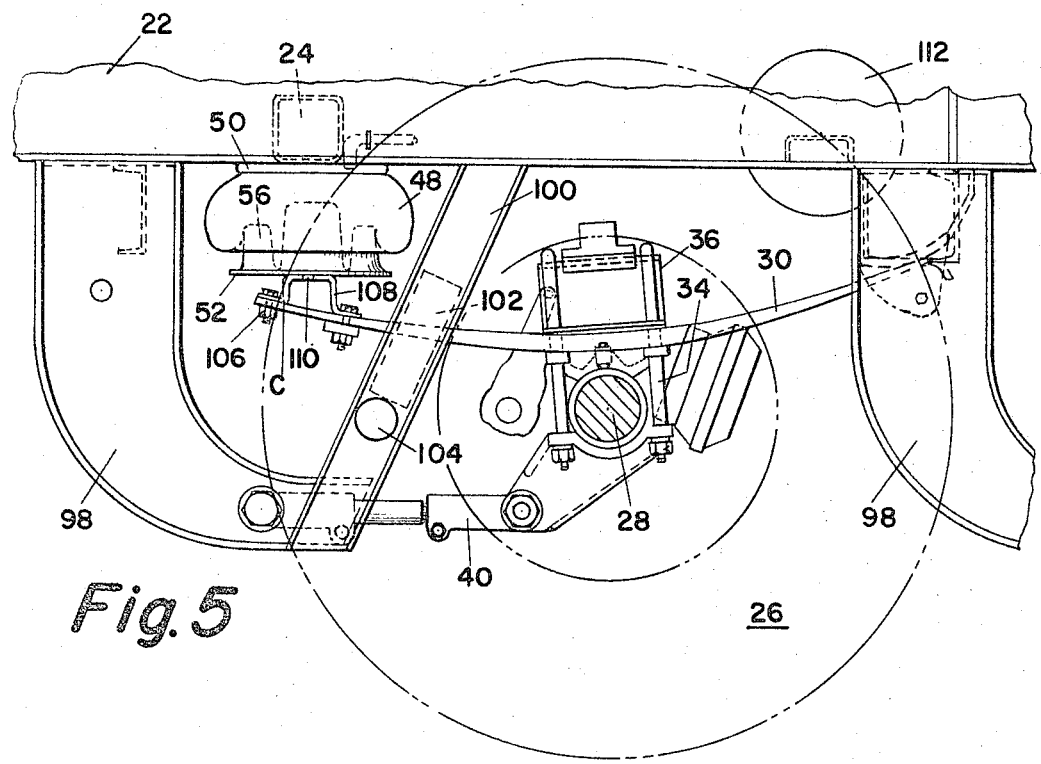
FIG. 5 is a view similar to FIG. 2 of another form of the invention.
Figure 6:
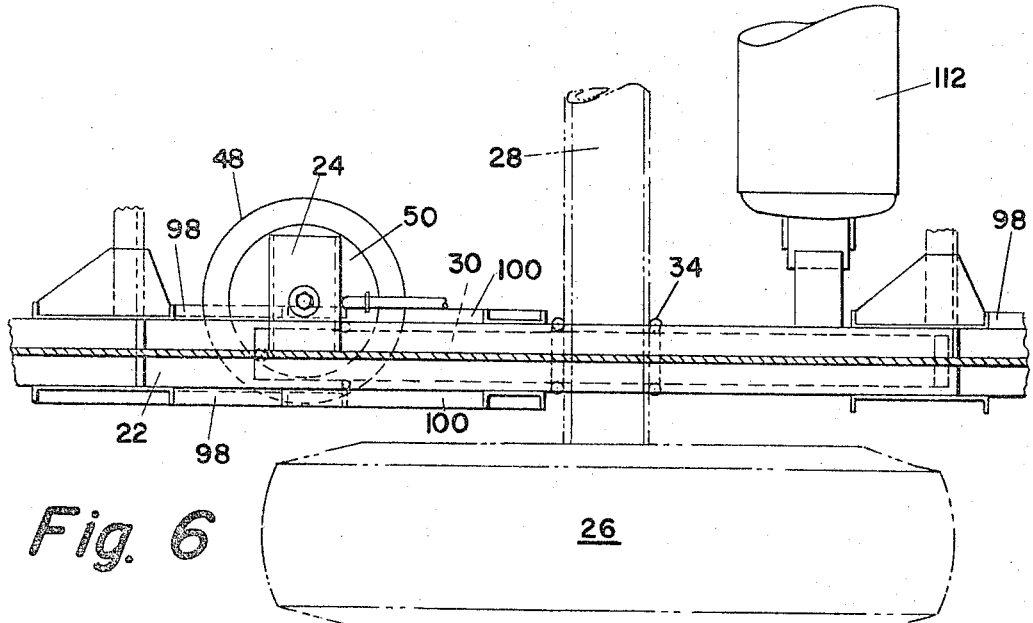
FIG. 6 is a fragmentary plan view looking down on FIG. 5.

In the modification shown in FIGS. 5 and 6 yet another stabilizer is employed. Depending from each side of each longitudinal frame members 22 at the front end of each of the springs 30 is a pair of hangers having a front curved portion 98 and a rearwardly extending straight portion 100, the inner faces of the portion 100 being provided with anti-friction plates 102, such as hard bronze, there being a transverse tube 104 between and through each pair of members 100 beneath the anti-friction plates. The front end portion of the leaf spring 30 extends between the anti-friction plates 102 and is secured as at 106 to a transverse bridging member 108 which is in turn secured as at 110 to the lower air bag pedestal 52. Thus, the sidewise movement of the bridging member is restrained by the members 100 at the anti-friction loci and the tubes 104 serve as stops to prevent excessive expansion of the air bags.

In the modification shown in FIG. 7, which is preferred, the air bag 48 is positioned closer to the axle 28; i.e., about half way between the axle and the forward end 118 of the spring 30 to provide for greater vertical motion of the axle for a given vertical motion of the air bag. This produces a softer ride because more of the load is carried by the air bag than when it is moved towards the end of the spring. The transverse bridging member 108 joining the air bags is secured at is ends to the springs 30 at the desired positions by clamp bars 114 which extend beneath the spring, there being bolts 116 which extend through the clamp bars and flanges of the bridging member 108 but outside the width of the spring so as to avoid through holes in the spring which are starting points for metal fracture. Secured to the axle assembly is one end of a strap 117 whose other end is clamped between the rear clamp bar 114 and the leaf spring 30, the rear clamp bolts 116 passing through said strap and bar, the strap serving to prevent movement of the bridging member 108 and air bag 48 towards the forward narrower end of the spring. Each front end portion 118 of the leaf spring 30 extends between anti-friction plates 120 which are provided on the inner faces of a pair of hangers 122 which depend from the sides of the longitudinal frame members 22 at the location of the front ends of the springs. Thus as distinguished from the modification shown in FIGS. 5 and 6, it is only the very end portion 118 of each leaf spring which is restrained against lateral motion so that wear, if any, will be confined to the end of the spring where no major working stresses are concentrated. A rubber bumper 124 embraces the bolt 44 below the rear end 32 of the leaf spring to reduce chatter when braking.

In use, because of the location of the air bags at the front of the leaf springs, when the brakes are applied to the vehicle, the braking energy is absorbed not by the low rate air bags but rather by the high rate rear portion of the leaf spring which rests against the solid portion 46 of the bracket 42 of the chassis frame. Thus, one secures the advantages of the soft ride of air suspensions but without the disadvantages of hopping or chattering normally encountered therewith. Because of the stability provided by the rear spring halves and the lateral stabilizers in the front, no shock absorbers are needed and side loads due to jackkniving when parking or executing sharp turns are readily absorbed. Also, the construction is such that the spring centers can be wider apart for extra stability while the air bags can be closer together for clearance of the various frame parts. It will be understood that the vehicle body will be equipped with a conventional height control valve and conduits interconnecting the air bags to each other and to the conventional air brake supply tank 112 whereby the pressure in the air bags can be adjusted, regulated and equalized. If desired, a system such as that shown and described in my aforesaid copending application, Ser. No. 256,297, may be employed. It is to be understood that the principles of the invention are applicable to multiple leaf as well as single leaf spring units or constructions and the term "leaf spring" unless otherwise qualified, as used in the claims, it intended to cover a construction in which one or more leaves is included in the leaf spring construction.

I claim:

1. In a vehicle having a body including a rear end portion and a front portion adapted for connection to a tractor, a spring suspension for a wheeled unit comprising a chassis connected to the rear end portion of the body, an axle mounting wheels and extending transversely beneath said chassis, elongated leaf springs extending longitudinally of said chassis, means suspending said axle centrally from said leaf springs, means mounting the rear end of each leaf spring on said chassis for longitudinal flexing movement relative thereto, a rigid bridging member extending transversely beneath said chassis, means clamping said bridging member on said leaf springs intermediate their front ends and said axle, and air bags interposed between said bridging member and said chassis.

2. The combination of claim 1 wherein said clamping means includes retaining bolts positioned outside of said leaf springs.

3. The combination of claim 2 wherein said leaf springs narrow towards their ends, and a means to restrain sliding movement of said bridging member towards the narrower front ends of said leaf springs, said last-named means including a strap connected to said means suspending said axle centrally from said leaf springs and to said bridging member via at least one of said retaining bolts.

4. The combination of claim 1 wherein said means mounting the rear end of each leaf spring includes a bracket depending from said chassis and a bolt carried by said bracket, the rear end of the leaf spring extending into said bracket above said bolt, and a resilient bumper embracing said bolt and adapted to engage the rear end of the spring to reduce chatter on braking.

5. In a vehicle having a body including a rear end portion and a front portion adapted for connection to a tractor, a spring suspension for a wheeled unit comprising a chassis connected to the rear end portion of the body, an axle mounting wheels and extending transversely beneath said chassis, elongated single leaf springs extending longitudinally of said chassis, means suspending said axle centrally from said leaf springs, means mounting the rear end of each leaf spring on said chassis for longitudinal flexing movement relative thereto, a rigid bridging member extending transversely beneath said chassis, means clamping said bridging member on said leaf springs intermediate their front ends and said axle, and air bags interposed between said bridging member and said chassis substantially midway between the front ends of said leaf springs and said axle.

6. In a vehicle having a body including a rear end portion and a front portion adapted for connection to a tractor, a spring suspension for a wheeled unit comprising a chassis connected to the rear end portion of the body, an axle mounting wheels and extending transversely beneath said chassis, elongated leaf springs extending longitudinally of said chassis, means suspending said axle centrally from said leaf springs, means mounting the rear end of each leaf spring on said chassis for longitudinal flexing movement relative thereto, hangers depending from said chassis receiving and limiting the lateral movement of the front ends of said leaf springs, longitudinal radius rods beneath said leaf springs interconnecting said hangers and said axle, a rigid bridging member extending transversely beneath said chassis, means clamping said bridging member on said leaf springs intermediate their front ends and said axle, and air bags interposed between said bridging member and said chassis.

7. In a vehicle having a body including a rear end portion and a front portion adapted for connection to a tractor, a spring suspension for a wheeled unit comprising a chassis connected to the rear end portion of the body, an axle adapted to mount wheels, a pair of transversely spaced elongated relatively stiff leaf springs, means suspending said axle from said leaf springs intermediate their ends, means mounting the rear end of each leaf spring on said chassis for longitudinal flexing movement relative thereto, an air bag interposed between the front end of each leaf spring and said chassis, means retaining said air bags in position, and means to restrain longitudinal and sidewise movement of said air bags relative to said chassis, said restraining means including pedestals supporting said air bags, a bracket depending from said chassis between said air bags, a pair of stabilizer rods each mounting a pedestal adjacent one of its ends and pivoted at its other end to said hanger, and means mounting the front end of each leaf spring on a corresponding rod adjacent a corresponding air bag.

8. In a vehicle having a body, a spring suspension for a wheeled unit comprising a chassis connected to the body, an axle mounting wheels and extending transversely beneath said chassis, elongated leaf springs extending longitudinally of said chassis, means suspending said axle centrally from said leaf springs, means mounting the rear end of each leaf spring on said chassis for longitudinal flexing movement relative thereto, a rigid bridging member extending transversely beneath said chassis, means for clamping said bridging member on said leaf springs intermediate their front ends and said axle, and air bags interposed between said bridging member and said chassis.

References Cited by the Examiner

UNITED STATES PATENTS

| | | | |
|---|---|---|---|
| 1,368,563 | 2/1921 | Liebau | 267—32 |
| 2,717,787 | 9/1955 | Ward | 267—56 X |
| 2,771,303 | 11/1956 | Frazier | 280 |
| 2,941,817 | 6/1960 | Benson | 267—66 |
| 2,945,702 | 7/1960 | Winkelmann | 267—31 |
| 3,031,179 | 4/1962 | Peirce | 267—31 |
| 3,063,732 | 11/1962 | Harbers | 280—124 |
| 3,084,952 | 4/1963 | Freitas | 280—112 |

FOREIGN PATENTS 98,516   7/1961   Netherlands.

BENJAMIN HERSH, *Primary Examiner.*

A. HARRY LEVY, *Examiner.*

W. A. MARCONTELL, *Assistant Examiner.*